Sept. 25, 1934.   E. H. LORENZ   1,974,824
METHOD OF AND APPARATUS FOR FORMING GLASSWARE
Filed April 2, 1930   4 Sheets-Sheet 1

Sept. 25, 1934.    E. H. LORENZ    1,974,824
METHOD OF AND APPARATUS FOR FORMING GLASSWARE
Filed April 2, 1930    4 Sheets-Sheet 4

Inventor
Edward H. Lorenz
by his Attorneys

Patented Sept. 25, 1934

1,974,824

UNITED STATES PATENT OFFICE 1,974,824

METHOD OF AND APPARATUS FOR FORMING GLASSWARE

Edward H. Lorenz, West Hartford, Conn., assignor to Hartford-Empire Company, Hartford, Conn., a corporation of Delaware Application April 2, 1930, Serial No. 440,962

15 Claims. (Cl. 49—5)

My invention relates to the manufacture of glassware, and particularly to methods of, and apparatus for, forming glassware, wherein a charge of glass is gathered by suction and in which a plurality of molds act upon the glass to give it first a preliminary and then a final shape. More particularly, it relates to the formation of hollow glassware, such as bottles, in three distinct stages and by the operation of three molds, i. e., a "blank mold" into which the glass is sucked, and which cooperates with a neck ring and neck pin to form a blank; a "parison mold" in which the blank is blown into a parison; and a "finishing mold" in which the parison is blown to final shape. In my copending application, Ser. No. 398,166, filed Oct. 8, 1929, a method of and apparatus for forming glassware in such stages is disclosed and claimed and this application, which is a continuation in part of the aforesaid application, discloses another method of and apparatus for fabricating glassware in accordance with the principles of the invention in the previously filed application. Such principles are set forth therein as follows:

"Heretofore in the fabrication of glassware by the suction method, the glass to form each article has been sucked into and shaped in one mold to form a parison, and finished in a second mold. This two-mold method suffers from disadvantages inherent in the method, arising from the fact that the sucking operation completely fills the cavity of the parison mold, and hence renders impossible, or well nigh so, the formation of a parison having an adequately blown cavity, and having other desirable characteristics; the defects in such parisons often result in the production of imperfect glassware."

Glassware made by the suction method usually is superior to that made for example by the gob-feed method, because of its better optical appearance. That is due to the fact that in the suction method, the amount of distortion imparted to the glass in the primary stages of formation is a minimum, inasmuch as the parison mold is completely filled and the completion of the parison requires little further manipulation which would distort the glass and aggravate or create non-uniform physical and thermal distribution.

On the other hand, in the gob-feed method the parison mold usually is only partially filled and the subsequent settle and counterblowing operations cause a relatively bad optical appearance in the finished ware. But in spite of this, the general distribution in the glass in ware made by the gob-feed method is better than that made by the suction method; there is less difference between the maximum and minimum wall thickness. Hence, the article made by the gob-feed method is stronger (its thinner part is thicker) than is the case with the suction made article, and less glass is required for making a given article by the gob-feed method than by the suction method.

The poor general distribution in suction-made glassware often is manifested by eccentricity of the inner and outer walls, by unduly thin shoulders, and other defects.

"It is important in forming glassware by the so-called 'narrow-neck or parison method' that the initial cavity formed by a neck plunger or neck pin be enlarged by blowing during the formation of the parison, in order to assure the proper setting of the finish and shoulders of the ware during the parison stage, and to prevent such portions of the ware from being blown out too thin in the final blowing stage. The formation of an adequately large cavity in the parison is also necessary to assure the maximum production of the machine. This is due, in part, to the fact that the enlarging of the cavity causes a corresponding increase in the external area of the parison which facilitates chilling and shortens the final blowing period. Proper blowing of the parison after the neck pin has been withdrawn is necessary also to assure a suitable uniform intimate contact of the glass with the mold walls, and hence a suitable chilling of the surface of the glass forming the body of the parison, in order that the body of the parison will be properly formed, and will have sufficient rigidity to be transferred without undue distortion, and in order that it acquire a definitely symmetrical viscosity which will permit uniform distributions of portions of the glass during the final blowing.

"Though the desirability of blowing a large initial cavity in the parison has been recognized, in the past to some extent, this problem has been heretofore but inadequately solved in the suction gathering machines of the prior art."

"In one of the two-mold methods, the glass is gathered by suction into the parison mold and neck ring and about a neck pin or plunger, and blowing pressure is thereafter applied to the glass while it is inclosed by the mold and a shear blade which closes the bottom of the mold. This blowing tends to give the desired intimate contact of the glass with the mold walls, but because of the fact that the molds are completely filled with glass during the sucking operation, the glass can only be compacted, and not distended to increase the external area thereof while the mold is closed. Sometimes in this process, the blowing has been followed by a cracking of the body parison mold. The compressed air which has been admitted thus has an opportunity to distend the parison to some extent while it is suspended from the neck ring. While this process is better than one in which no parison blowing is attempted, it does not adequately and properly prepare the parison for the final blowing stage, and it is obvious that adequate control of the parison formation is lost to a considerable extent in following this practice."

Therefore, the principal object of the present invention, (which is also the principal object of the invention in my prior application) is to provide a novel method and novel apparatus for the performance thereof, by which glass may be sucked upwardly into a preliminary or blank mold and associated neck ring, and about a neck pin, whereby a blank is first formed and the neck portion or finish of the bottle is given its final shape. Promptly thereafter the blank is transferred, preferably by the neck ring, to a second or "parison mold" which has a cavity intermediate in shape between those of the blank and the finishing molds. In this mold (the parison mold) the blank is blown into a parison. The mold is preferably a complete mold having an integral bottom closure so that all portions of the blank are positively blown out against a mold surface and suitably and uniformly chilled; a suitable large bubble or initial cavity is formed in the parison; and any shear mark which may appear on the blank is obliterated while the glass is still relatively hot.

"At this time, the shoulder portions, which are usually weak and improperly formed by the older methods, are given a thickness approaching more closely their desired final thickness, and are more properly set than in the prior method. The parison having been formed in the 'parison mold', it is then transferred to a finishing mold and blown to final form, the proper preparation of the parison before its transfer permitting a proper and uniform distribution of the glass in the ware formed in the finishing mold. Such distribution is materially aided by the added chilling resulting from the increased area of the parison, and from the additional chilling action of the parison mold itself. Consequently, the final blowing operation may be performed more quickly and efficiently than has been possible heretofore."

The present invention may be distinguished in part from that disclosed in my prior application in that the several operations in forming the blanks, parisons, and finished articles are performed while the respective glass fabricating means are continuously moving, and it therefore is an object of this invention to provide a novel method of and apparatus for forming glassware in the three stages as above described, without interrupting the movements of the several glass forming mechanisms. Thus, by employing the present invention, the three-stage method is performed more rapidly and more efficiently than is possible in the use of the invention in the aforesaid application.

Another object of this invention is to provide a novel method of, and apparatus for, forming glassware wherein a charge of glass may be gathered by suction in a moving blank mold, and the blank thereafter is subjected to blowing pressure in a moving parison mold, such operations being performed at about the same time that a previously blown parison is being given its final shape in a moving finishing mold.

Another object of this invention is to provide a novel method of, and apparatus for, fabricating glassware in which glass blanks are successively supplied to a plurality of moving parison molds from a single moving blank mold, the parisons being successively transferred from the parison molds to companion finishing molds, which may be movable with the parison blow molds, so that in each cycle of operation, a plurality of parisons are successively shaped in the parison molds while other parisons are being blown to final form in the finishing molds.

Other objects and advantages of this invention will be pointed out in the detailed description thereof which follows, or will become apparent from such description.

In order that the invention may be more fully comprehended, reference should be had to the accompanying drawings, in which novel apparatus for the performance of the method is illustrated.

In said drawings.

In general, the apparatus of the present invention may include a single blank forming unit B. Said unit is carried by an inclined reciprocating and oscillating ram and comprises a blank mold, neck mold, a neck pin, a vacuum and blow head, and rotary shear mechanism. The blank forming unit B is moved continuously in a closed path as indicated approximately by the dotted line in Fig. 1, to successively gather charges of glass and form said charges into blanks. The movement of the blank forming unit is such that after a charge has been gathered and formed into a blank, the blank is moved into alignment with one of the parison molds P and caused to travel with said mold while the parison mold closes about the blank, and the blank is blown into a parison through the neck mold. Upon completion of the blowing of the parison, the blank forming unit B again is moved toward and lowered into contact with the gathering pool to gather a charge for a blank for the succeeding parison mold. The parison molds P are mounted at spaced intervals upon a continuously rotating table and said table also carries the finishing molds F which are rotatably mounted for movements in vertical planes into and out of vertically upright positions. Each parison mold has associated therewith a combined final blow head and tongs transfer device T which is arranged to close about the neck of a parison held in the parison mold, to support the parison as the parison mold is opened, and while the companion finishing mold is elevated and closed about the parison. After the parison has been enclosed by the finishing mold, blowing air is supplied to the combined blow head and transfer device T to blow the parison to final shape, the device T then being opened and the finishing mold lowered to discharge the finished article at the delivery station.

Figure 2:
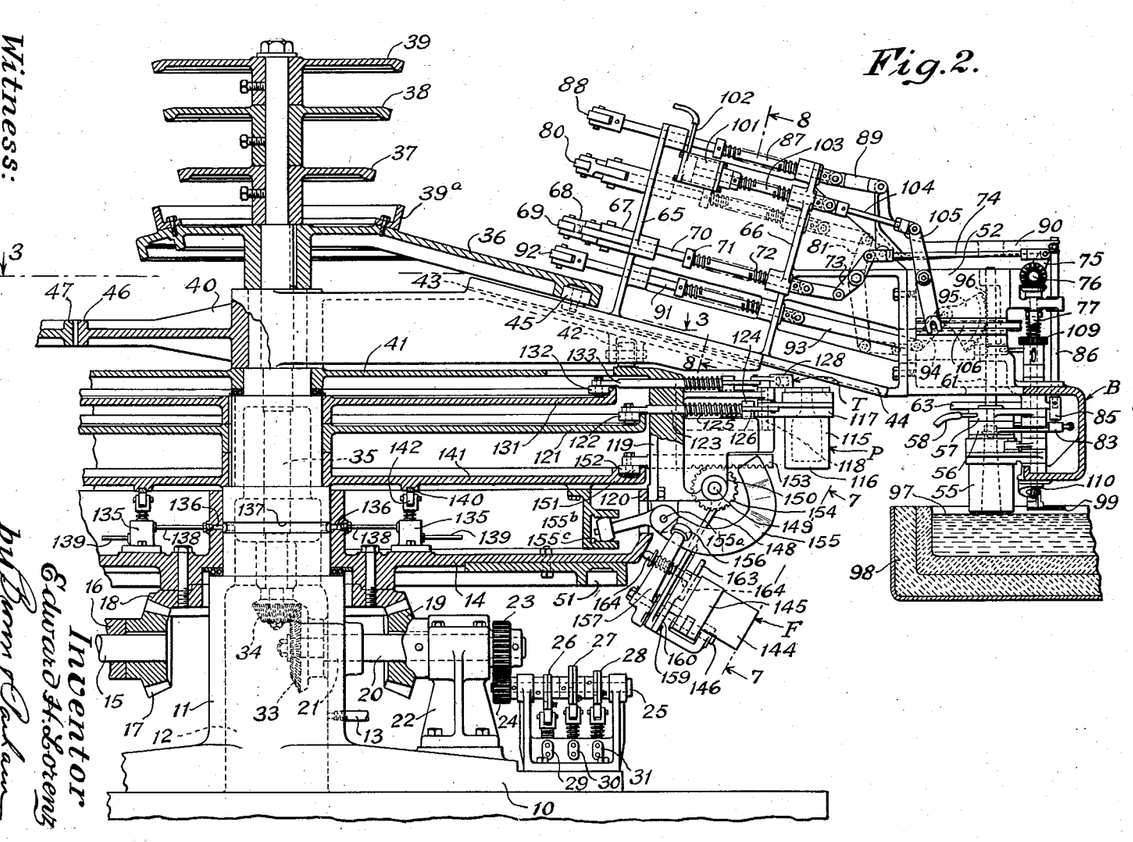
Fig. 2 is a view partly in longitudinal section and partly in side elevation of the apparatus shown in Fig. 1, and taken approximately on the line 2—2 of Fig. 1.

Referring in detail to the drawings:

The apparatus embodying this invention comprises a pedestal 10 from which arises a column 11, Fig. 2. A portion of the column 11 is hollow to provide an air reservoir 12 to which air is conducted from a suitable source by a conduit 13. Mounted on the column 11 is the hollow table 14. The table 14 is continuously rotated by means of a horizontal drive shaft 15 connected to suitable driving mechanism, not shown, and journaled in a bearing as indicated at 16. The shaft 15 carries a bevel gear 17 which meshes with a bevel ring gear 18 bolted to the bottom of the table 14, as shown. The shaft 15 is driven continuously to continuously rotate the table 14.

Also meshing with the ring gear 18 is a bevel gear 19 mounted on a horizontal shaft 20. One end of the shaft 20 extends through and is journaled in the hollow portion of column 11 as indicated at 21, and the other end thereof is journaled in a bracket 22 secured to the pedestal 10.

Mounted on the outer end of the shaft 20 is a gear 23 which meshes with a spur gear 24 fast on a cam shaft 25. Shaft 25 has cams 26, 27 and 28 mounted thereon adapted to open and close respectively valves 29, 30 and 31. Valves 29, 30 and 31 are opened and closed at appropriate times to control respectively the application of suction to the blank forming mechanism, the introduction of blowing air into the neck mold for blowing the parison, and to operate the shear mechanism, all as hereinafter explained.

Shaft 20 carries a bevel gear 33 on its inner end which meshes with a bevel gear 34 secured to the bottom end of a vertical rotary cam shaft 35 journaled in the column 11 and extending downwardly into the air reservoir 12, as is clearly shown in Fig. 2. Secured to the upper outer end of the shaft 35 are cams 36, 37, 38 and 39. Cam 36 also has a cam 39a mounted thereon. These cams control respectively the operation of the inclined ram and the several devices included in the blank forming mechanism B.

*The inclined ram and blank forming mechanism B*

Mounted for oscillation about the column 11 is the ram support and guide 40. The support 40 near its center of rotation rests directly upon the top 41 of the table 14 and near its outer end said support carries a roller 42 for reducing friction between the member 40 and the top of the table. Formed on the member 40 is an inclined guide 43 in which ram 44 is slidably mounted. See Figs. 2 and 8. The ram 44 is reciprocated inwardly and outwardly radially of the column 11 by means of cam 36 and a cam roller 45 mounted on the inner end of the ram and engaging the cam 36.

Figure 3:
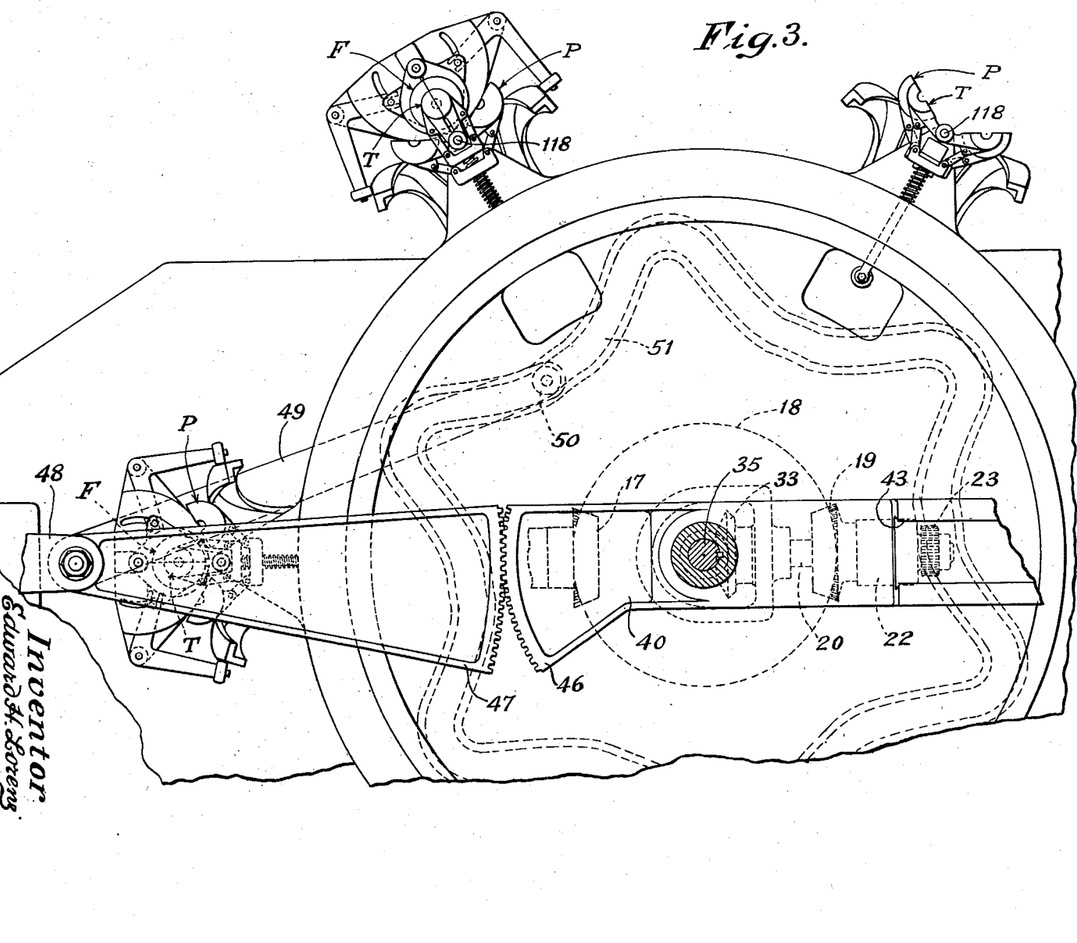
Fig. 3 is a view in horizontal sectional top plan similar to Fig. 1, but taken farther to the left of the apparatus than Fig. 1, and approximately on the line 3—3 of Fig. 2.
Figure 4:
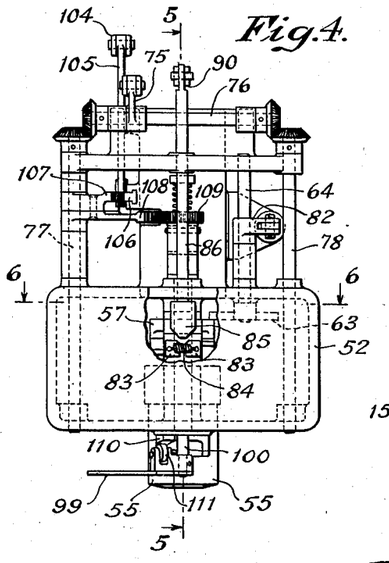
Fig. 4 is a view in end elevation on enlarged scale of the blank forming mechanism shown in Figs. 1 and 2.

The support 40 is oscillated at appropriate times by the following means: Formed on the left-hand end of support 40 (looking at Figs. 1, 2 and 3) is a segmental gear 46. The gear 46 meshes with a similar segmental gear 47 oscillatably mounted at its outer end upon a stationary support 48 as shown in Fig. 3. Connected to the outer end of the segmental gear 47 is an inwardly extending arm 49 upon the inner end of which is mounted a cam roller 50. The cam roller 50 engages a downwardly facing cam 51 provided on the bottom of the table 14, Figs. 2 and 3. The contour of cam track 51 is such as to oscillate the ram and the blank forming unit supported thereby at appropriate times to cause the blank forming unit to move across the gathering pool to gather a charge for a blank and subsequently to follow the path of rotation of a parison mold P. The combined reciprocation of the ram 44 produced by cam 36 and the oscillation of the ram resulting from the operation of cam 51 causes the blank forming unit to move continuously in a closed path such as is indicated approximately by the dotted line in Fig. 1. As the ram is projected outwardly it is swung over the gathering pool to dip the blank mold in the glass. Thus, the blank mold may suck up a charge while it is swinging in a direction opposite to the direction of rotation of the table 14.

Considering now the construction of the blank forming mechanism B carried by the ram 44 and referring particularly to Figs. 1, 2, 4, 5, 6, and 8, it will be seen that a frame 52 is secured to the outer end of ram 44. Mounted in the lower portion of the frame 52 is a vertical sleeve 53. The sleeve 53 serves as a common support for the holders 54 for the blank mold sections 55, the holders 56 for the sections of the neck mold, and the suction and blow head 57 which is rigidly secured to said sleeve.

Figures 5, 6, 8, 9:
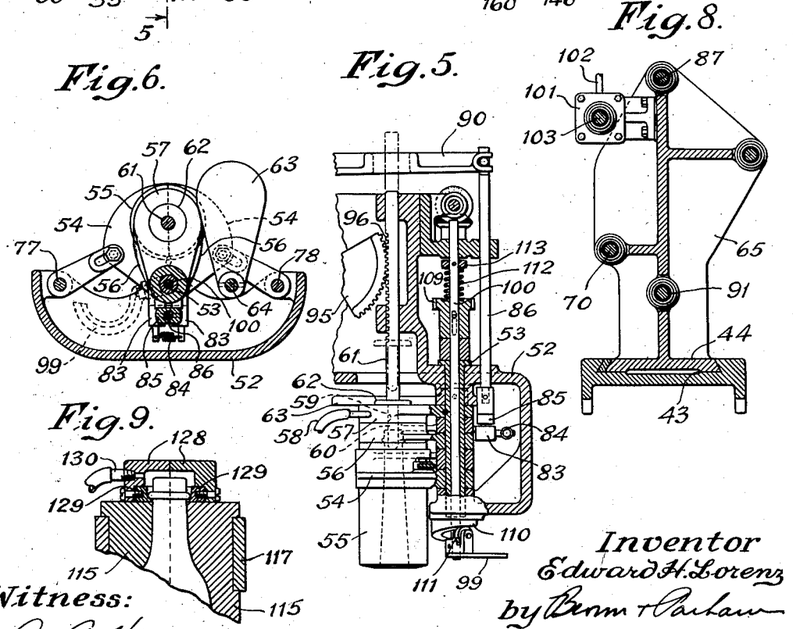
Fig. 5 is a view in longitudinal vertical section taken approximately on the line 5—5 of Fig. 4.
Fig. 6 is a view in transverse horizontal section taken approximately on the line 6—6 of Fig. 4.
Fig. 8 is a view in cross section of the inclined ram taken on the line 8—8 of Fig. 2.
Fig. 9 is a view in longitudinal section showing the combined final blow head and tongs in engagement with a parison in a parison mold.

The vacuum and blow head 57 has a conduit 58 connected thereto to which vacuum and parison blowing air are alternately conducted from valves 29 and 30, previously referred to, Figs. 2 and 5. Said head also has a central recess 59 formed therein through which a neck pin 60 is projected into the neck mold. The neck pin 60 is formed on the bottom end of a rod 61 slidably mounted in the frame 52, see Fig. 5. Downward movement of the neck pin is limited by a stop 62 on rod 61.

To prevent the escape of parison blowing air through opening 59 during the parison blowing operation, after the neck pin has been retracted, as will hereinafter appear, a swinging cover plate 63 is provided for closing the opening 59 in said head, Figs. 5 and 6. The cover plate 63 is carried by a vertical shaft 64 suitably journaled in the frame 52, Figs. 4 and 6.

The ram 44 carries operating devices for the blank mold 55, the neck mold, the neck pin, and the cover plate, which devices are adapted to be moved into operative engagement with the respective cams mounted on cam shaft 35, upon inward movement of said ram. To this end, ram 44 is provided with a pair of upstanding transverse brackets 65 and 66 formed integrally with longitudinally extending strengthening webs.

Figure 1:
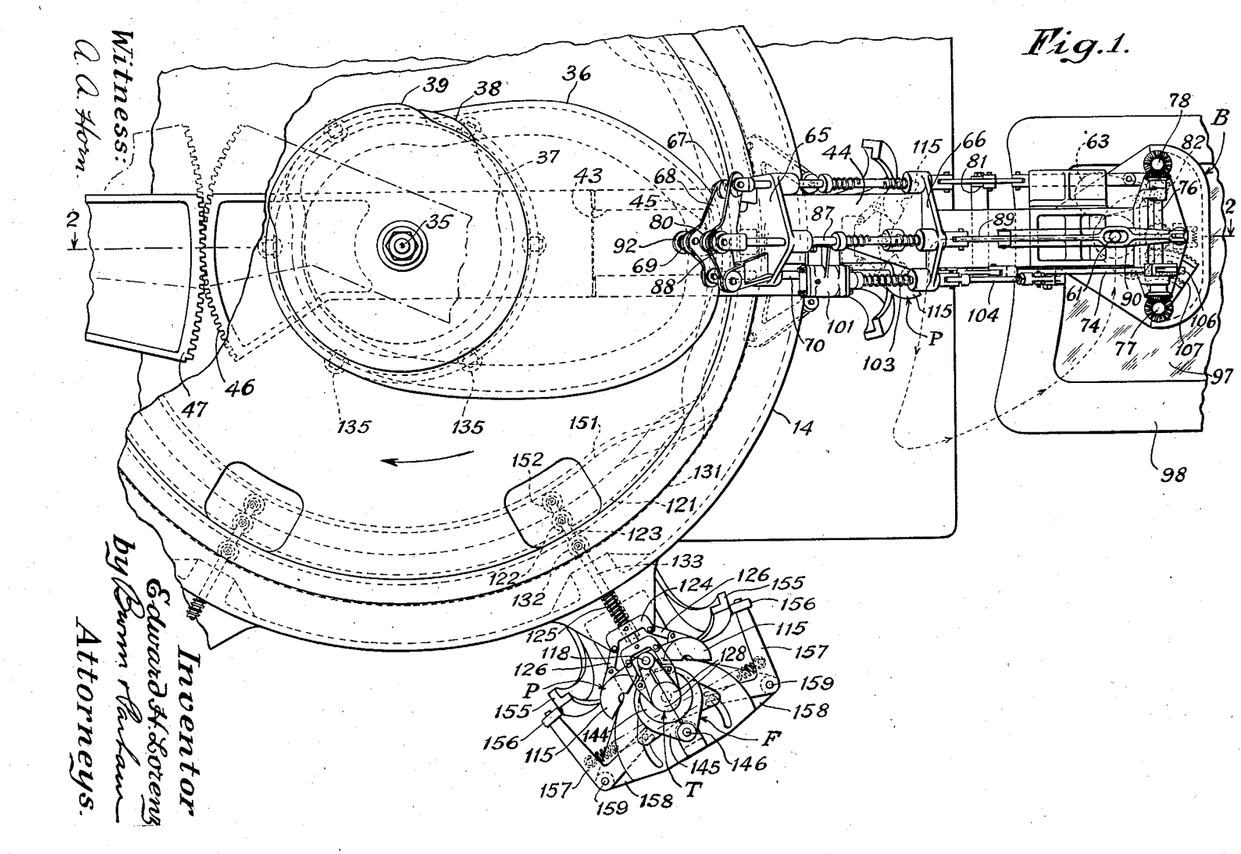
Figure 1 is a plan view of apparatus embodying the invention and showing the parts thereof in the positions which they occupy at the time that the gathering of a charge of glass in the blank forming unit is being terminated, and a previously blown parison is being subjected to final blowing pressure in a finishing mold.

Considering first the mechanism for operating the blank mold, and referring to Figs. 1 and 2, it will be seen that bracket 65 has an inwardly extending lug 67 formed thereon. Pivoted to the lug 67 is a lever 68 which carries a cam roller 69 between its ends, and which is connected to a reciprocating rod 70, slidably mounted in the brackets 65 and 66. Interposed between the bracket 66 and a collar 71 on the rod 70 is a compression spring 72. At its outer end, rod 70 is connected by a link to a pivoted lever 73, which lever is in turn connected to a rod 74. The rod 74 operates a crank arm 75 secured to a transverse horizontal shaft 76 suitably journaled on the frame 52, Figs. 2 and 4. Mounted on the ends of the shaft 76 are bevel gears which mesh with similar bevel gears secured to the top ends of vertical shafts 77 and 78. The shafts 77 and 78 have crank arms mounted thereon joined by pin and slot connections to the blank mold holders. The blank mold opening and closing mechanism between the shaft 76 and the blank mold holders is substantially the same as that disclosed in my copending application above referred to, and hence need not be described in further detail. Suffice to say, spring 72 holds the rod 70 in inwardly retracted position which serves to retain the blank mold closed. Upon inward movement of the ram 44, roller 69 comes into engagement with cam 37 and at the proper time, the rod 70 is moved outwardly to open the blank mold, by the rotation of said cam.

The mechanism for operating the cover plate 63 is for the most part identical in construction with the blank mold operating means and includes a lever which carries a cam roller 80. The outer end of the cover plate operating rod is connected by a link to a pivoted lever 81, the lower end of which is connected through suitable linkage to a crank arm 82, secured to the vertical shaft 64 which carries the cover plate. See Fig. 4. The spring encircling the cover plate operating rod serves to hold the cover plate in open position as shown in Fig. 6, during the charge gathering and blank forming operations, but when the ram 44 is moved inwardly, cam roller 80 is brought into engagement with the cam 38, which cam serves to swing the cover plate into closed position after the neck pin is retracted.

The neck ring opening and closing means is constructed as follows: The ends of the neck ring holders extend outwardly beyond sleeve 53 as indicated at 83 in Figs. 4, 5 and 6. The portions 83 of the neck ring holders have pins mounted thereon between which a tension spring 84 is interposed. The tension spring 84 yieldingly holds the neck ring closed. After a blank supported by the neck ring has blown into a parison in a parison mold, through the neck ring, the neck ring is opened by means of a wedge 85 supported on the bottom end of the rod 86, slidably mounted in the frame 52.

The wedge 85 is depressed by the operation of the following mechanism: A reciprocable rod 87 having a cam roller 88 mounted on its inner end is slidably mounted in brackets 65 and 66, said rod being similar to rod 70 and being provided with a compression spring which serves to yieldingly hold the rod into inwardly retracted position, Fig. 2. Rod 87 is connected at its outer end to a link 89 which in turn is connected to a bell crank lever 90, the outer end of which is joined to the upper end of the rod 86 by means of a pin and slot connection, as is clearly shown in Fig. 5. The compression spring which encircles the rod 87 serves to yieldingly hold wedge 85 in raised position, but when the ram 44 is moved to its innermost position, cam roller 88 is brought into operative engagement with cam 39 so that by the time the blowing of a blank into a parison through the neck ring is completed, the rotation of cam 39 operates to depress the wedge 85 to open the neck mold, releasing the parison in the parison mold.

Mechanism similar to that provided for opening the neck mold is provided for retracting the neck pin, said mechanism comprising the rod 91 which carries a cam roller 92 on its inner end, Fig. 2. The rod 91 also is provided with a compression spring and is connected to its outer end to a link 93, which link, in turn, is connected to a crank arm 94 which serves to oscillate a segmental gear 95, Figs. 2 and 5. Gear 95 meshes with a rack 96 formed on the upper end of the rod 61 which carries the neck pin 60. As will be understood, the compression spring which cooperates with rod 91 yieldingly holds the neck pin in depressed position during the period in which a charge is gathered and formed into a blank in the blank forming mechanism. However, when the ram 44 is moved inwardly of the mold table, cam roller 92 engages the cam 39a, as a result of which rod 91 is moved outwardly of the mold table and the neck pin is retracted.

After a charge of glass for a blank has been gathered in the blank forming mechanism B from a gathering pool indicated at 97 and which may be contained in a suitable stationary extension of a melting tank, (or if preferred in a rotary pot) as illustrated at 98, (Figs. 1 and 2) a vertically movable rotary shear blade 99 operates to sever the tail or string of glass from the charge in the blank mold. The shear blade 99 is secured to the bottom end of a rod 100 (Fig. 5) slidably and rotatably mounted in the sleeve 53, previously referred to. The rod 100 and the shear blade supported thereby are rotated by the following means: Secured to the central vertical web extending between the brackets 65 and 66 is an air motor 101, Figs. 2 and 8. Air is admitted to one end of the air motor 101 through a conduit 102 suitably connected to valve 31, previously referred to. The rod 103 of the air motor extends through and is guided in bracket 66, as shown for example in Fig. 2, and is held in inwardly retracted position by means of a compression spring interposed between a collar on said rod and the bracket 66. At its outer end, rod 103 is connected by means of a link 104 to the upper end of a lever 105, the bottom end of which is joined by a pin and slot connection to a horizontal slidable rack 106, Figs. 2 and 4. Rack 106 meshes with a segmental gear 107 (Fig. 4) mounted for oscillation on vertical shaft 77. Gear 107 is connected to segmental gear 108, also mounted on shaft 77, which gear meshes with a pinion 109 mounted on and slidably connected to rod 100, Figs. 4 and 5.

In order to effect a lowering movement of the shear blade when said blade is rotated to effect the severing operation, a stationary cam 110 (Fig. 5) is provided on the bottom of the frame 52 surrounding the bottom portion of rod 100. Cam 110 is engaged by a cam roller 111 provided on the hub of the shear blade 99, which roller is yieldingly held in engagement with the cam by means of a compression spring 112 interposed between the top of pinion 109 and a collar 113 secured to the rod 100. By means of this construction, admission of air into air motor 101 causes rotation of rod 100 and shear blade 99, and at the same time the cooperation of cam roller 111 with cam 110 causes the shear blade to be lowered to the proper level to sweep the bottom of the blank mold 55. Upon release of the air pressure from air motor 101, the compression spring surrounding rod 103 rotates rod 100 and the shear blade in the opposite direction which thereupon are elevated by spring 112 and cam 110 to a sufficient height to permit the blank mold subsequently to be dipped into the glass in the gathering pool without however moving the shear blade into contact with the glass.

If desirable or necessary, suitable means may be provided for circulating a cooling medium such as air or water in or about the blank forming mechanism B to counteract the heating thereof by the hot molten glass in the gathering pool.

The parison molds (P)

We next come to consider the construction of the parison molds, and since these molds may be identical in construction, a description of one will suffice for all. Each parison mold comprises mating sections 115 preferably having bottom sections 116 formed integrally therewith, Figs. 1, 2 and 3. The sections 115 are mounted in holders 117 pivoted upon an upstanding stud 118. The stud 118 is mounted in the top horizontal web portion of a casting of general inverted U-shape in cross section and formed preferably integrally with an annular portion 119 of the table 14. The annular portion 119 is suitably bolted to a vertically upturned flange 120 provided on the bottom horizontal portion of table 14.

The opening and closing of the parison mold is controlled by means of a stationary cam 121 formed on a plate secured to the column 11 of the machine. The cam 121 is engaged by a cam roller 122 mounted on the inner end of a horizontal radially extending rod 123 connected at its outer end to a cross head 124. Cam roller 122 is yieldingly held in engagement with cam 121 by means of a compression spring 125 interposed between the cross head 124 and the portion 119 of the table. The cross head 124 is connected by links 126 to the holders 117 of the parison mold sections.

The combined finish blow head and tongs (T)

After a blank has been blown into a parison in the parison mold, and the blank forming unit again is moved toward the gathering pool, the parison is grasped by the combined blow head and transfer device T to permit the parison mold to open whereby the suspended parison may be enclosed by the companion finish mold and the parison blown to final shape therein. The device T comprises a pair of hollow mating sections 128, (Figs. 1, 2, 3 and 9) pivoted to the post or stud 118, previously referred to. Grippers 129 are secured in recesses formed on the inner sides of the members 128, by means of screws or the like, as shown for example in Fig. 9. One of the members 128 is provided with a blowing air conduit 130, as illustrated in said Fig. 9.

The opening and closing of the device T is controlled by means of a stationary cam 131 formed on a plate secured to the column 11 of the machine, Fig. 2. Cam 131 is engaged by a cam roller 132 mounted on the inner end of a rod 133 slidably mounted in the annular portion 119 of the table. The combination blow head and tongs operating mechanism is substantially identical with that provided for opening and closing the parison mold and hence need not be described in greater detail.

The admission of final blowing air into the devices T is controlled by the following means: A plurality of valves 135 are mounted on the inner side of the table 14 (Fig. 2) at spaced intervals, there being one valve for each of the blow heads T. Air is conducted to the valves 135 from the air reservoir 12, through radial ports 136 provided in the column 11, and communicating with an annular groove 137 formed on the exterior of said column. Groove 137 constantly communicates through radial ports provided in the hub of the table 14, with conduits 138 which lead to the valves 135. Discharge conduits 139 lead from the valve 135 to the conduits 130 connected to the blow heads T. The valves 135 are opened and closed at appropriate times by means of a stationary cam 140 provided on the under side of cam plate 141 secured to the column 11 of the machine. Cam 140 is engaged by cam rollers 142 provided on the upper ends of the stems of valves 135.

The finishing molds (F)

Each of the finishing molds, which may be identical in construction, includes mating sections 144 carried by holders 145 mounted on a pivot stud 146, Figs. 1, 2, 5 and 7. The stud 146 in turn is mounted in a support 147 upon the inner end of which are formed a pair of spaced arms 148 secured to a shaft 149. The ends of the shaft 149 are trunnioned in the side walls 150 of the inverted U-shaped casting previously referred to, and formed on the annular portion 119 of the table 14. Thus, the finishing mold is supported for vertical oscillation.

The finishing mold is swung upwardly into vertically upright position to enclose a parison supported by the combined blow head and tongs device T for the final blowing of the parison, and is swung downwardly and inwardly into the position shown in Fig. 2 to discharge the completed article at the delivery station. Such movements of the finishing mold are controlled by means of a cam 151 (Fig. 2) formed on the cam plate 141 and engaged by a cam roller 152 mounted on the inner end of a radially extending rack 153. The rack 153 is slidably mounted in the annular portion 119 of the table and meshes with a pinion 154 secured to the shaft 149 between the arms 148 of the finishing mold support 147. As will be understood, the contour of cam 151 is such that the finishing mold is raised and lowered at appropriate times.

Figure 7:
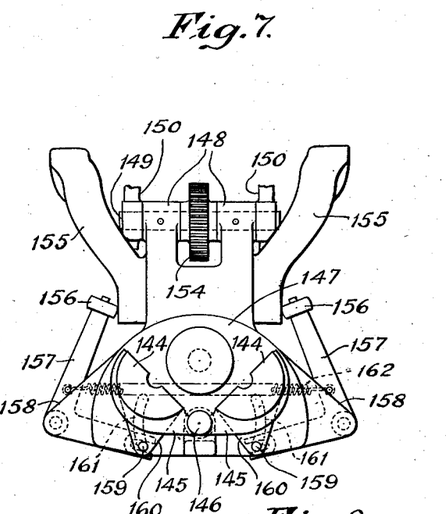
Fig. 7 is an enlarged view partly in section and partly in elevation of one of the finishing molds, and taken approximately on the line 7—7 of Fig. 2.

The finishing mold is opened and closed by means of upwardly and outwardly flaring cams 155. (Figs. 1, 2 and 7.) The cams 155 are pivoted at 155a and are jointly raised or lowered at appropriate times by means of a lever 155b connected thereto, and carrying a roller which engages a cam 155c.

Cams 155 are engaged by rollers 156 mounted on the inner arms of bell crank levers 157. Bell crank levers 157 are pivotally supported by laterally extending lugs 158 formed on the support 147. The outer ends of bell crank levers 157 are slotted for engagement with pins 159 mounted in and extending downwardly or inwardly through lugs 160 formed on the holders 144. The pins 159 extend into arcuate slots 161 formed on the top of the support 147 to guide the pins in their movements. The inner arms of the bell crank levers 157 are yieldingly held in engagement with cams 155 by means of a tension spring 162 interposed between said arms. As the finishing mold is swung upwardly, the inner arms of the bell crank levers 157 are forced outwardly by cams 155, partially closing the mold. After the mold has been moved into its vertically upright position, cams 155 are lowered by lever 155b, completing the closing of the mold about a parison. After the blowing of the parison has been completed, cams 155 are raised, permitting the inner arms of the bell crank levers to be drawn together to partially open the mold, which then is completely opened upon the subsequent lowering of the mold, as will be understood.

The finishing mold is provided with a bottom plate 163 slidably mounted on the support 147 by means of a push rod 164 (Fig. 2) extending through an opening in said support. The bottom plate 163 is yieldingly held in engagement with the top of said support by means of a compression spring 165 interposed between the bottom of the support and a collar mounted on said rod 164. When the finishing mold is lowered and swung inwardly into the position shown in Fig. 2, the mold is opened leaving the finished article resting on the bottom plate and the inner end of rod 164 strikes the edge of the table 14 to eject the finished article at the delivery station. In this manner, the finished article is prevented from sticking to the bottom plate.

*Operation*

The operation of my novel apparatus is subject to variations, but one preferred mode of operation which may be employed in carrying out my novel method is as follows:

The blank forming unit B is moved continuously substantially counterclockwise in the path indicated by the dotted line in Fig. 1 and the table 14 is continuously rotated in a clockwise direction. The combined operations of cam 36 and cam 51 serving respectively to reciprocate the ram 44 and to oscillate said ram, cause the blank forming mechanism B to be moved alternately outwardly and into contact with the gathering pool and upwardly and inwardly into alignment with a parison mold P. As the mechanism B is moved toward the gathering zone, the blank and neck molds are closed, the neck pin is depressed, and the shear blade is held in elevated position. When the bottom of the blank mold is in contact with the surface of the glass in the gathering pool 97, the mechanism B is swinging in a direction opposite to the direction in which table 14 rotates, suction is applied to the mold by the operation of the valve 29 and the molds are filled with glass from said pool. The movement of the blank mold in contact with the glass in the gathering pool causes a very desirable circulation of the glass therein in a generally horizontal direction, as a result of which chilled spots and the tails of glass produced in the gathering and severing operations are removed from the gathering zone to prevent them being entrained in the subsequently gathered glass. At the completion of such swinging movement, the blank forming mechanism is aligned radially with a parison mold, whereupon the ram starts its inward radial movement to raise the blank mold from the pool and shear blade 99 is rotated and lowered to sever the tail of glass from the charge in the blank mold, which tail falls back into the gathering pool. The inward radial movement of the ram 44, affected by cam 36, moves the blank forming unit toward an approaching parison mold and during such movement, the blank mold is opened leaving the blank suspended from the neck mold, the neck pin is retracted, and the cover plate closes the neck pin opening in the head 57. The inward rectilinear movement of the ram 44 brings the suspended blank into vertical alignment with the previously opened parison mold whereupon oscillation of the support 40 through the action of cam 51 causes the blank forming unit and the blank to move in coincidence with the parison mold which thereupon is closed about the parison. As soon as the parison mold is closed, blowing air is supplied to the blow head 57 by the operation of valve 30 and the parison is blown in the parison mold through the neck ring while the blank forming unit and the parison mold move in coincidence about the axis of the table 14.

Upon completion of the blowing of the parison, the neck mold is opened by the operation of cam 39 and the blank forming unit again is swung toward the gathering pool to gather a charge and form another blank for the succeeding parison mold. While a second blank is being formed, the combined blow head and tongs device T closes about the neck of the parison in the parison mold, and the parison mold is opened, leaving the blank suspended from the device T, after which the appropriate finishing mold is elevated between the sections of the parison mold and closed about the suspended parison. Final blowing air thereupon is admitted into the device T through the operation of the appropriate valve 135, the application of such blowing air being continued until the finish mold nears the delivery station. At this time, the blow head and tongs device T opens, and the finishing mold is lowered to deliver the finished article at the delivery station. In the meantime, the blank forming mechanism will have operated continuously to supply blanks successively to the other parison molds in which the blanks are blown into parisons, and which parisons in turn are enclosed by the appropriate finishing molds and subsequently blown to final shape. Thus, it will be seen that the blank forming, and the parison forming and final blowing cycles overlap extensively. In the construction illustrated herein, the blank forming mechanism operates through six cycles for each cycle of operation of a parison mold and of the companion finishing mold, although each cycle of operation of the blank forming mechanism may take part in each parison blowing operation. It will be understood that the number of parison and finishing molds may be varied if desired. Moreover, the above mode of procedure may be modified to exclude the parison blowing operation from the cycle of operation of the blank forming mechanism, thus permitting said mechanism to operate more rapidly and speeding up the operation of the machine. This may be accomplished by blowing the parisons through the blowheads T instead of the neck mold of the blank forming mechanism, in which event appropriate changes will be made in the contours of the various cams and other timing mechanisms and in the distribution of blowing air, etc. Such changes may be made by one skilled in the art and need not be described in detail.

It is to be understood that other changes in the details of construction of my novel apparatus and the mode of procedure of my novel method may be made without departing from the invention, as defined in the appended claims.

Having thus described my invention, what I desire to claim and to secure by Letters Patent is:

1. The method of fabricating glassware which comprises, moving a blank mold and a companion neck mold toward and away from a gathering pool, gathering a charge of glass from said pool in the blank mold and neck mold by suction, to form a blank having a finished neck portion, continuously moving a parison mold, subjecting the blank formed in the blank mold and neck mold to preliminary blowing pressure in said parison mold to form a parison therein, continuously moving a finishing mold, transferring the parison to the finishing mold, blowing the parison to final shape in said finishing mold, and effecting all of said operations in fixed time relation to each other.

2. The method of fabricating glassware which comprises, gathering a charge of glass in a blank mold and neck mold by suction, opening the blank mold and leaving the blank suspended from the neck mold, continuously moving a parison mold, closing the parison mold about the suspended blank, subjecting the blank to preliminary blowing pressure to form a parison in said mold while it is being moved, opening the neck mold, continuously moving a finishing mold, transferring the parison from the parison mold to the finishing mold, blowing the parison to final shape in the finishing mold while said mold is being moved, and effecting all of such operations in fixed time relation to each other.

3. A glassware forming machine comprising a blank mold and a companion neck mold, means for forming blanks having finished neck portions in said blank mold and neck mold, means for carrying the blank and neck molds in a closed path, a parison mold, means including a carrier separate from said carrying means for continuously moving said parison mold horizontally, means for supporting said carrier for movement laterally of the path of the blank and neck molds, means for introducing a blank formed in the blank mold into the parison mold, including means for opening the blank mold to leave a blank suspended from the neck mold, and means for closing the parison mold about the suspended blank, means for blowing the blank into a parison in said parison mold, a finishing mold, means for continuously moving said finishing mold, means for transferring a parison from the parison mold to the finishing mold while said molds are moving, means for blowing the parison to final shape in the finishing mold, and automatic means for synchronizing the operations of the aforesaid means.

4. A glassware forming machine comprising a blank forming mechanism, said mechanism including a neck mold and a blank mold, means for moving said mechanism toward and away from a gathering pool to gather a charge for a blank therein by suction, a parison mold, means for continuously rotating said parison mold horizontally, positively acting means for introducing a blank in neck up position into said parison mold, means for blowing the blank into a parison in said parison mold, a continuously moving finishing mold, means for transferring the parison to the finishing mold, means for blowing the parison to final shape in the finishing mold, and automatic means for synchronizing the operation of the aforesaid means.

5. A glassware forming machine comprising a single blank mold, a plurality of parison molds, means for continuously moving said parison mold horizontally, means for successively moving said blank mold toward and away from a pool of molten glass to gather successive charges of glass for blanks by suction, positively acting means for successively introducing the blanks into the parison molds, said last-named means including means for supporting blanks when the blank mold is opened, means for opening the blank mold, and means for closing the parison molds about the blanks held by said supporting means, means for blowing the blanks into parisons in said parison molds, a plurality of continuously moving finishing molds, means for successively transferring the parisons to the finishing molds, means for blowing the parisons to final shape in the finishing molds, and automatic means for synchronizing the operation of the aforesaid means.

6. A glassware forming machine comprising a blank mold having a neck mold associated therewith, means for filling said molds with a charge of glass from a gathering pool by suction, which charge is formed into a blank in said blank mold and neck mold, a continuously moving sectional parison mold, means for opening the blank mold to leave the blank suspended from the neck mold, means for moving the neck mold and blank into radial and vertical alignment with the parison mold and for causing said neck mold and blank to travel with the parison mold, means for closing the parison mold about the blank, means for subjecting the blank to blowing pressure in said parison mold to form a parison, a continuously moving finishing mold, means for transferring the parison from the parison mold to the finishing mold while said molds are moving, means for blowing the parison to final shape in the finishing mold, and automatic means for synchronizing the operation of the aforesaid means.

7. A glassware forming machine comprising a single blank forming mechanism including a blank mold and a superimposed neck mold, means for successively moving the blank forming mechanism toward and away from a gathering pool to gather glass in said blank and neck mold and to form a succession of blanks in neck-up position, said means including mechanism for imparting orbital movement to said blank forming mechanism, a continuously rotating mold table, a plurality of parison molds mounted on said table, means for successively introducing the blanks formed in the blank forming mechanism into the parison molds in neck-up position, means for blowing the blanks into parisons in said parison molds, a plurality of finishing molds mounted on said table, means for transferring the parisons from the parison molds to the finishing molds while said molds are moving, and means for blowing the parisons to final shape in the finishing molds.

8. A glassware forming machine comprising a blank forming mechanism, said mechanism including a blank mold and a superimposed neck mold, means for successively moving said mechanism toward and away from a gathering pool to gather charges of glass in said blank and neck molds, a continuously rotating mold table, a plurality of sectional parison molds mounted on said table, means for successively moving the blank forming mechanism into radial and vertical alignment with the parison molds, means for opening the blank mold during the movement of said mechanism toward a parison mold to leave a previously formed blank suspended from the neck mold, means for closing a parison mold about the suspended blank, means for causing the neck mold and the suspended blank to travel with the parison mold to permit the mold to close about the blank, means for supplying blowing air through the neck mold to blow the blank into a parison while the neck mold travels with the parison mold, a plurality of finishing molds mounted on said mold table, means for transferring the parisons from the parison molds to the finishing molds while said molds are moving, and means for blowing the parisons to final shape in the finishing molds.

9. A glassware forming machine comprising a blank forming mechanism, said mechanism including a blank mold and a neck mold, a carrier for and individual to said forming mechanism, means for actuating said carrier to move said mechanism in a predetermined closed path, means for supplying charges of glass for blanks to said blank forming mechanism, a plurality of parison molds, means for horizontally moving said parison molds, positively acting means for transferring blanks in neck-up position from the blank forming mechanism to the parison molds including means for opening the blank mold to leave a blank suspended by the neck mold, means for controlling the parison mold moving means to align the axial center line of a parison mold with the axial center line of the blank, and means for closing the parison mold about the suspended blank, a plurality of finishing molds, a plurality of transfer devices for transferring parisons from the parison molds to the finishing molds, and automatic means for synchronizing the operation of all of the aforesaid instrumentalities.

10. A glassware forming machine comprising a blank forming mechanism, said mechanism including a blank mold and a neck mold, means for supplying glass for blanks to said blank forming mechanism to form a succession of blanks having finished neck portions, a plurality of parison molds, means for continuously moving said parison molds in a horizontal direction, positively acting means for transferring blanks from the blank forming mechanism to the parison molds, a plurality of continuously moving finishing molds, a plurality of transfer devices for transferring parisons from the parison molds to the finishing molds, and automatic means for synchronizing said devices with the parison and finishing molds.

11. A glassware forming machine comprising a blank forming mechanism, said mechanism including a blank mold and a neck mold, means for supplying charges of glass for blanks to said blank forming mechanism, a plurality of continuously moving parison molds, means for successively moving the blank forming mechanism into alignment with the parison molds, and for causing said mechanism to travel successively with said parison molds, a plurality of continuously moving finishing molds, a plurality of transfer devices for transferring parisons from the parison molds to the finishing molds, and automatic means for synchronizing the operation of said devices with the parison and finishing molds.

12. A glassware forming machine comprising a blank forming mechanism, said mechanism including a blank mold and a neck mold, means for supplying charges of glass for blanks to said blank forming mechanism, a plurality of parison molds, positively acting means for transferring blanks successively from the blank forming mechanism to the parison molds, a plurality of finishing molds, a plurality of transfer devices for transferring parisons from the parison molds to the finishing molds, means for closing each transfer device about a parison in a parison mold, means for opening the parison mold leaving the parison suspended from the transfer device, means for closing a finishing mold about the suspended parison, and automatic means for timing the operations of said means and devices.

13. In a glassware forming machine, a hollow blowhead formed in laterally separable sections having imperforate top portions, each of said sections being provided with a gripper on the interior thereof, means for opening and closing said blowhead, and means for supplying blowing air to said blow head.

14. A glassware forming machine comprising a blank forming unit, said unit comprising a sectional blank mold and a sectional neck mold, a carrier for said unit, means for forming blanks having finished neck portions in said unit, a sectional parison mold, a continuously traveling carrier for said parison mold, means for actuating said first-named carrier to move said unit in a closed path toward and away from the parison mold, means for opening the blank mold during such movement to leave a blank suspended from the neck mold, means for actuating the parison mold carrier to move the parison mold in a closed path and horizontally into and along a portion of the path of the blank, means for closing the parison mold about the suspended blank during movement thereof along the path of the blank, means for blowing the blank into a parison in the parison mold, a continuously rotating finishing mold, means for introducing the parison into the finishing mold while said finishing mold is moving, means for blowing the parison to final shape in the finishing mold, and automatic means for synchronizing all of the aforesaid instrumentalities.

15. The method of fabricating glassware which comprises continuously moving a blank mold and a companion neck mold, and while so moving the molds charging them with glass and forming a blank therein having a finished neck portion, continuously moving a parison mold, transferring the blank to the parison mold and expanding the blank into a hollow parison in the parison mold and while the parison mold is being moved, and thus forming a parison having a large cavity therein, and increasing the external area of the glass previously constituting the blank to facilitate the abstraction of heat from the glass by the parison mold, and forming a parison intermediate in size and shape between those of the blank and the finished article to be produced therefrom, continuously moving a finishing mold, transferring the hollow parison to the finishing mold, blowing the parison to final shape in the finishing mold by applying air to the large cavity of the parison for a substantial period of time and sufficient to both initially form a finished article and to set the glass therein, and effecting all of said operations in fixed timed relation to each other.

EDWARD H. LORENZ.